United States Patent
Ackermann

(10) Patent No.: US 7,312,689 B2
(45) Date of Patent: Dec. 25, 2007

(54) FUSE WITH METALLIC STATE INDICATOR

(75) Inventor: John Marvin Ackermann, Belleville, IL (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 10/886,084

(22) Filed: Jul. 7, 2004

(65) Prior Publication Data

US 2005/0062578 A1 Mar. 24, 2005

Related U.S. Application Data

(60) Provisional application No. 60/485,459, filed on Jul. 8, 2003.

(51) Int. Cl.
*H01H 85/30* (2006.01)
*H01H 85/157* (2006.01)

(52) U.S. Cl. ............... 337/206; 337/265; 337/252; 337/248; 337/250

(58) Field of Classification Search ......... 337/241, 337/242, 245, 265, 206, 243, 248–252, 187; 116/206, 207; 324/507, 550; 439/491; 340/638, 340/639
See application file for complete search history.

(56) References Cited

U.S. PATENT DOCUMENTS

| | | | | |
|---|---|---|---|---|
| 874,797 A * | 12/1907 | Sachs et al. | ................ | 337/243 |
| 914,043 A * | 3/1909 | Hart et al. | ................ | 337/241 |
| 4,205,294 A * | 5/1980 | Jacobs, Jr. | ................ | 337/234 |
| 4,263,575 A * | 4/1981 | Fontaine | ................ | 337/241 |
| 4,274,073 A * | 6/1981 | Luck et al. | ................ | 337/248 |
| 4,760,367 A * | 7/1988 | Williams | ................ | 337/241 |
| 5,994,993 A | 11/1999 | Castonguay, Jr. et al. | | |
| 6,292,087 B1 | 9/2001 | Castonguay, Jr. et al. | | |
| 6,456,189 B1 | 9/2002 | Mosesian et al. | | |
| 6,459,357 B2 | 10/2002 | Castonguay, Jr. et al. | | |
| 2002/0113684 A1* | 8/2002 | Arikawa et al. | ................ | 337/163 |

* cited by examiner

*Primary Examiner*—Anatoly Vortman
(74) *Attorney, Agent, or Firm*—King & Spalding

(57) ABSTRACT

A fuse includes an insulative body, a primary fuse element extending within the body, a fuse state indicator extending on an exterior surface of the body and electrically connected in parallel with the primary fuse element, and first and second ferrules coupled to opposing ends of the fuse body and electrically connecting the primary fuse element and the fuse state indicator. At least one of the ferrules includes a recessed contact area establishing electrical connection to the fuse state indicator.

21 Claims, 2 Drawing Sheets

FUSE WITH METALLIC STATE INDICATOR

CROSS REFERENCE TO RELATED APPLICATIONS

This application claims the benefit of U.S. Provisional Application Ser. No. 60/485,459 filed Jul. 8, 2003, which is hereby incorporated by reference in its entirety.

BACKGROUND OF THE INVENTION

This invention relates generally to fuses and, more particularly, to fuses with a fuse state indicator.

Fuses are widely used as overcurrent protection devices to prevent costly damage to electrical circuits. Fuse terminals typically form an electrical connection between an electrical power source and an electrical component or a combination of components arranged in an electrical circuit. A fusible link is connected between the fuse terminals, so that when electrical current flowing through the fuse exceeds a predetermined limit, the fusible link melts and opens the circuit through the fuse to prevent electrical component damage.

Fuse indicators have been developed for various types of fuses to facilitate identification of inoperable fuses due to an opened fuse link. One type of fuse state indicator includes conductive thin metallic films extending on an outer surface of a insulative fuse body. See, for example, U.S. Pat. Nos. 6,459,357, 6,456,189, 6,292,087, and 5,994,993. In such fuses, one or more layers of metallic film extend on the outer surface of an insulative fuse body between conductive end caps or terminals, sometimes referred to as ferrules, that are attached to the opposite ends of the fuse body with a crimping operation. A conductive path is therefore established through the metallic films for fuse state indication, and the conductive path through the metallic film is established in parallel with the primary fuse link. When the primary fuse link operates to open the electrical circuit therethrough, current flows through the thin metallic films which visibly indicate the operational state of the fuse. Opened fuses may therefore be readily identified and replaced.

Termination of the thin metallic films to the ferrules of the fuse has proven problematic. It is difficult to attach the ferrules to the indicator without damaging the indicator. U.S. Pat. Nos. 6,459,357, 6,292,087 and 5,994,993 each include conductive leads to connect the indicator to the respective ferrules. The conductive leads complicate the construction and manufacture of the fuse, as well as introduce potential reliability issues in operation.

Moreover, undesirable electrical arcing from ferrule-to-ferrule may occur when known fuse state indicators including thin metallic films operate to indicate an opened fuse. Especially in smaller fuses having a reduced longitudinal distance or separation between the ferrules of the fuse (e.g., fuses having an axial length of about two inches or less), the tendency for arcing on the exterior of the fuse body between the ferrules has been demonstrated. As the ferrules are crimped to the fuse body, initial electrical contact between the metallic film indicators and the ferrules is made at the edges of the ferrules where they are crimped to the fuse body. When the fuse state indicator operates, and especially when the indicator opens near the ferrules, metallic vapors are generated at the contact points between the ferrules and the indicator. Uncontrolled discharge of metallic vapor is believed to contribute to ferrule-to-ferrule arcing.

U.S. Pat. No. 6,456,189 describes conductive rings attached to a fuse body in electrical connection with the fuse state indicator, and conductive ferrules are attached over the conductive rings to complete a conductive path through the indicator. The construction appears to at least partially obviate conditions that create electrical arcing between the ferrules, but the conductive rings introduce additional components and associated cost to the fuse construction.

BRIEF DESCRIPTION OF THE INVENTION

According to an exemplary embodiment, a fuse is provided. The fuse comprises an insulative body, a primary fuse element extending within the body, a fuse state indicator extending on an exterior surface of the body and electrically connected in parallel with the primary fuse element, and first and second ferrules coupled to opposing ends of the fuse body and electrically connecting the primary fuse element and the fuse state indicator. At least one of the ferrules comprises a recessed contact area establishing electrical connection to the fuse state indicator.

According to another exemplary embodiment, a fuse is provided. The fuse comprises an insulative body comprising an outer surface and an inner surface, a primary fuse element extending within the inner surface, and first and second ferrules coupled to opposing ends of the fuse body with the primary fuse element extending therebetween. Each of the first and second ferrules comprises a notch formed therein and extending toward the outer surface, and a fuse state indicator extends on the outer surface between the first and second ferrules. The notches establish electrical connection to the fuse state indicator to connect the fuse state indicator in parallel with the primary fuse element.

According to still another exemplary embodiment, a fuse comprises an insulative body, a primary fuse element, and first and second conductive elements coupled to the body with the primary fuse element extending therebetween. Each of the first and second conductive elements comprises an inwardly facing notch formed therein, and a fuse state indicator extends between the first and second ferrules. The notches are configured to establish an electrical connection to the fuse state indicator and increase an effective length of the fuse state indicator between the first and second ferrules, thereby connecting the fuse state indicator in parallel with the primary fuse element while reducing electrical arcing between the first and second ferrules when the fuse state indicator operates.

DETAILED DESCRIPTION OF THE INVENTION

Figure 1:
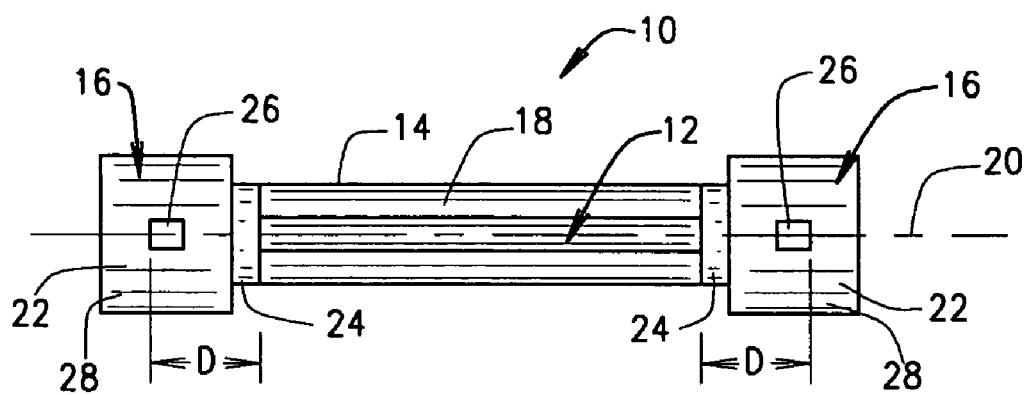
FIG. 1 is a plan view of an exemplary embodiment of a fuse with a state indicator.

FIG. 1 is a plan view of an exemplary embodiment of a fuse 10 with a state indicator 12. The fuse 10 includes an insulative (i.e., nonconductive) fuse body 14 and conductive ferrules 16 attached thereto on either end thereof. The fuse state indicator 12 extends on an outer surface 18 of the fuse body 14 between the ferrules 16 and is electrically connected to the ferrules 16 in the manner explained below. The fuse body 14 is elongated in the direction of a longitudinal axis 20 and is generally cylindrical in the illustrated embodiment, although it is appreciated that the benefits of the instant invention may apply to non-cylindrical fuses, including but not limited to rectangular fuses, in alternative embodiments. In one exemplary embodiment, the fuse body 14 has a length measured along the longitudinal axis 20 of approximately 2.065 inches, although it is appreciated that the fuse body 14 may have a greater or lesser length in an alternative embodiment. Further, it is understood that the invention is applicable to a wide variety of fuses intended for a wide variety of applications and having a wide variety of fuse ratings. Therefore, the embodiments of the invention shown and described herein are for illustrative purposes only, and the invention is not intended to be restricted to a particular fuse type, class, or rating.

In an exemplary embodiment, the ferrules 16 are generally cylindrical and complementary in shape to the fuse body 14. The ferrules 16 include a first portion 22 having a larger diameter, and a second portion 24 having a smaller diameter extending axially from the first portion 22. In an exemplary embodiment, the second portion 24 has a diameter that is approximately 0.02 inches less than the diameter of the first portion 22, although other relative diameters and ratios of diameters of the second portion 24 with respect to the first portion 22 may be employed.

Each of the ferrules 16 further includes a recessed portion or notch 26 depending radially inward from an outer surface 28 of the first portion 22. In an illustrative embodiment, the notches 26 in the ferrules 16 are substantially rectangular in shape and are located an axial distance D of about 0.25 inches from the ends of the second portions 24 of the ferrules 16. It is appreciated, however, that other shapes, configurations, and locations of the notches 26 may vary in alternative embodiments without departing from the scope and spirit of the instant invention. As explained below, the notches 26 establish electrical connection to the fuse state indicator 12.

The fuse state indicator 12 includes a thin metallic film and is adapted to visually indicate the state of fuse 10 as operable or inoperable. The fuse state indicator 12 may be employed as part of a label (not shown) attached to the outer surface 18 of the fuse. Fuse state indicators 12 utilizing thin metallic films are known, and include one or more layers of conductive material and an indicating layer or material. When current flows through the conductive material in the indicator, the conductive material transforms or reveals the indicating layer or material to produce a visibly different external appearance of the fuse 10 in the vicinity of the indicator 12. Exemplary fuse indicator strips for the fuse state indicator 12 are described in detail in U.S. Pat. Nos. 6,459,357, 6,456,189, 6,292,087, and 5,994,993, each of which is expressly incorporated by reference herein, and the fuse state indicator 12 may be any of the foregoing types in exemplary embodiments of the invention, subject to the termination features described herein for electrically connecting the indicator strips to the ferrules. Additionally, in addition to the aforementioned thin metallic film fuse strip indicators, other known indication elements may be employed as the fuse state indicator 12 and terminated to the ferrules 16 as described below.

Figure 2:
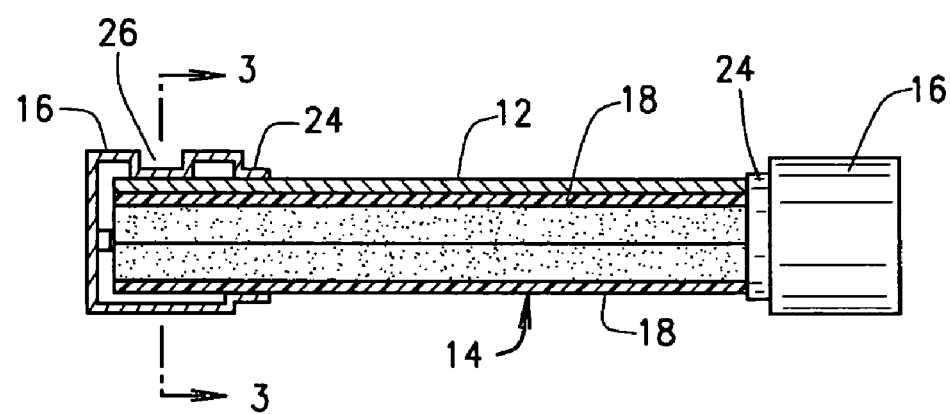
FIG. 2 is a side schematic view of the fuse shown in FIG. 1.

FIG. 2 is a side schematic view of the fuse 10 illustrating the fuse state indicator 12 electrically connected in parallel with a primary fuse link 40 extending between and electrically connected to each of the conductive ferrules 16. The primary fuse link 40 is a known fuse element, and in an exemplary embodiment includes one or more weak spots or areas of reduced cross sectional area (not shown) therein. In alternative embodiments, a wire fuse link, fuse element assembly, or other known fusible link construction may be employed as the primary fuse link 40. Additionally, more than one primary fuse link may be employed in further embodiments of the invention.

The primary fuse link 40 is electrically connected to the ferrules 16 with solder or other known electrical connection, and when the conductive ferrules 16 are connected to line-side and load-side electrical circuitry (not shown), a current path is created through the primary fuse link 40 between the ferrules 16. Likewise, the fuse state indicator is electrically connected to the ferrules 16 and a current path is created through the fuse state indicator 12 between the ferrules 16. The fuse state indicator 12 has a much higher electrical resistance than the primary fuse link 40, however, so that during normal operation of the fuse 10, substantially all of the current passing through the fuse 10 passes through the primary fuse link 40. The fuse body 14 is filled with an arc energy absorbing material 42, such as quartz sand, surrounding the primary fuse link 40. Quartz sand absorbs heat generated in the primary fuse link 40 in an overcurrent condition.

The fuse state indicator 12 is electrically connected to the ferrules 16 and extends on the outer surface 18 of the fuse tube 14. Specifically, the inwardly depending notches 26 in the first portion 22 of the ferrules 16 establish electrical contact with conductive portions of the fuse state indicator 12 adjacent each respective end of the fuse state indicator 12. The ferrules 16 are extended over the outer surface 18 of the fuse body 14 and over nonconductive portions of the fuse state indicator 12, and the ferrules 16 are roll crimped to the fuse body 14 to secure the ferrules 16 to the fuse body 14 via the second portions 24. As such, secure electrical connections are established between the ferrules 16 and conductive portions of the fuse state indicator 12 without damaging the fuse state indicator 12.

Upon an occurrence of a predetermined magnitude of current corresponding to the current rating of the fuse 10, sometimes referred to as a fault current, the primary fuse link 40 melts, vaporizes, disintegrates, or otherwise fails, thereby breaking the electrical connection through the primary fuse link 40. When the primary fuse link 40 opens, current is diverted into conductive portions of the fuse state indicator 12. The fuse state is then visibly indicated via a physical transformation of the fuse state indicator 12 when a substantial current flows therethrough when the primary fuse link 40 is opened.

The notches 26 contact the ends of the fuse state indicator 12 over a relatively small area that reduces the tendency of an electrical arc to form when the fuse state indicator 12 operates. Further, the contact areas of the notches 26 are moved laterally outwardly from the ends of the second portions 24 of the ferrules 16 to a location inside the first portion 22 of the ferrules 16, and hence the fuse indicator strip 12 has a greater effective length between the ferrules 16 than it would otherwise have if the electrical connection was established at the ends of the second portions 24 of the ferrules 16. In other words, by distancing the notches 26 farther away from one another in the first portions 22 of the ferrules 16, the distance between the electrical connections of the fuse indicator 12 to the respective ferrules 16 is increased. The greater longitudinal separation of the contact areas, by virtue of the notches 26, reduces potential arcing between the contact areas of the notches 26, while the overall length of the fuse 10 remains unchanged.

In an exemplary embodiment, each notch 26 is located a distance D (FIG. 1) which is approximately 0.25 inches from the interior end (i.e., the distal ends of the second portions 24) of the ferrules 16. Consequently, the electrical contact areas or contact points for the fuse state indicator 12, located at the notches 26, are separated from one another by an additional 0.5 inches measured along the longitudinal axis 20 (FIG. 1), and the additional 0.5 inches of separation may preclude arcing between the interior ends of the ferrules 16 when the fuse indicator 12 operates during a fault current condition after the primary fuse link 40 opens.

Establishing electrical connection to the fuse indicator 12 with the notches 26 is believed to reduce a likelihood that the fuse indicator 12 will open at the ends of the indicator 12 as opposed to opening in a more central location between the ferrules 16. If the fuse indicator 12 opens in the central portion of the fuse indicator 12 at a distance from the ferrules 16, metallic vapors are generally contained and electrical arcing is inhibited. By increasing the frequency of opening of the fuse indicator 12 in central portions of the fuse indicator 12, the potential for electrical arcing is accordingly reduced.

Figure 3:
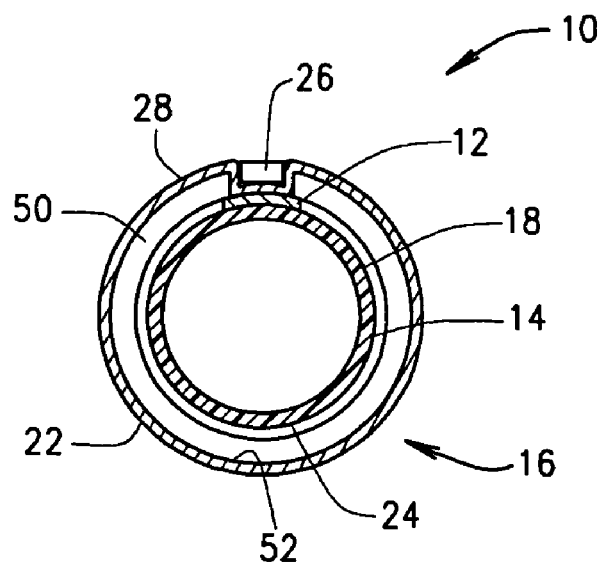
FIG. 3 is a cross sectional view of the fuse shown in FIG. 1 taken along line 3-3 in FIG. 2.

Additionally, and as illustrated in FIG. 3, the notches 26 in the ferrules 16 facilitate venting of metallic vapors if the fuse indicator strip 12 operates toward the ends of the fuse indicator 12 underneath the ferrules 16. As noted above, insufficient venting of metallic vapors when the fuse state indicator 12 operates is believed to be a contributing factor to the tendency of electrical arcing as known thin metallic film fuse state indicators operate.

Referring to FIG. 3, the fuse indicator 12 is attached to and extends upon the outer surface 18 of the fuse body 14, and the interior surface of the notch 26 contacts the conductive portion of the fuse state indicator 12 interior to or beneath the outer surface 28 of the ferrule 16. The notch 26 also serves to create a clearance 50 between the outer surface 18 of the fuse body 14 and an inner surface 52 of the first portion 22 of the ferrule 16. The clearance or gap 50 facilitates venting and containment of vapors as the conductive portions of the fuse indicator 12 vaporizes, disintegrates, or otherwise activates to indicate the operative state of the fuse 10. The notches 26 may be formed according to known processes and techniques, including but not limited to punching operations to deform the ferrule 16 with an interior facing projection without punching through or otherwise creating an aperture or opening in the vicinity of the notch 26.

While the fuse 10 is illustrated as having notches 26 in both of the conductive ferrules 16 coupled to the fuse body 14, and thus clearances 50 are established on both of the opposite ends of the fuse body 14, it is recognized that a notch 16 may be provided on only one of the ferrules 16 while still achieving at least some of the benefits of the present invention.

Fuse 10, and more specifically the notched ferrules 26, provides a reliable and secure electrical connection to the fuse indicator 12 without requiring external components to connect the fuse strip indicator strip 12 to the ferrules 16. Associated costs and manufacturing steps of additional components may therefore be avoided. Venting of vapors due to operation of the fuse indicator 12 is provided for in the clearance 50, and electrical arcing between the ferrules 26 is substantially avoided.

Figure 4:
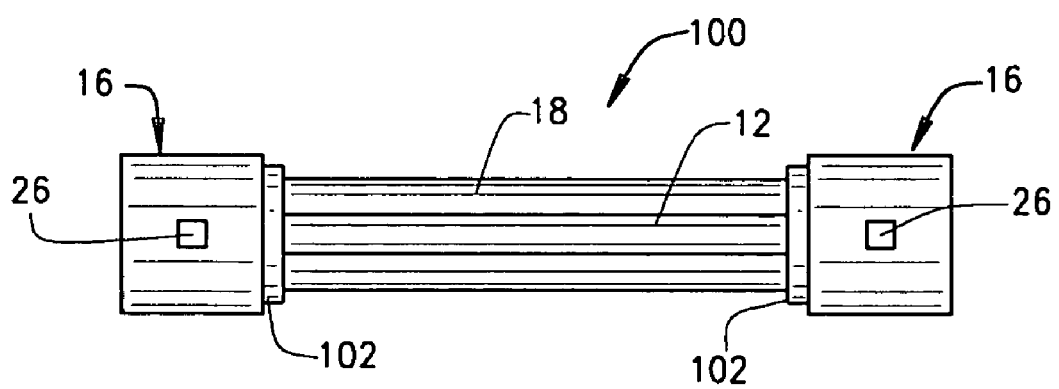
FIG. 4 is a plan view of a second exemplary embodiment of a fuse with a fuse state indicator.

FIG. 4 is a plan view of a second exemplary embodiment of a fuse 100 wherein like features of fuse 10 (illustrated in FIGS. 1-3) are illustrated with like reference characters.

Fuse 100 includes an insulative fuse body 14 and conductive ferrules 16 attached thereto on either end thereof. The fuse state indicator 12 extends on an outer surface 18 of the fuse body 14 and is electrically connected to the ferrules 16 via notches 26, as described above. Unlike fuse 10, however, the ferrules 16 are not crimped to the ends of the fuse body 14, but rather are mounted thereto with an adhesive sealing compound 102, such as a Loctite 660 compound familiar to those in the art.

The notches 26 create a clearance between the ferrules 16 and the fuse body 14 for venting of vapors and gases as described above, thereby avoiding arcing between the ferrules 20 as the fuse indicator strip 12 operates. Excess pressure in the clearance may force a portion of the sealing compound 102 to rupture and vent vapors and gases to the atmosphere external to the fuse 100.

It is appreciated that the sealing compound 102 may be employed in combination with the crimped ferrules 16 of the fuse 10 in another embodiment of the invention.

While the invention has been described in terms of various specific embodiments, those skilled in the art will recognize that the invention can be practiced with modification within the spirit and scope of the claims.

What is claimed is:

1. A fuse comprising:
an insulative body;
a primary fuse element extending within said insulative body;
first and second ferrules coupled to opposing ends of said insulative body and electrically connecting said primary fuse element and a fuse state indicator, wherein said fuse state indicator extends on an exterior surface of the insulative body between said ferrules and in parallel with said primary fuse element;
a clearance between the exterior surface of the insulative body and an interior surface of at least one of said ferrules; and
a recessed contact area formed in the at least one ferrule for electrically connecting the at least one ferrule to said fuse state indicator within said clearance, said recessed contact area comprising an interior facing projection formed in said ferrule without creating an aperture therein.

2. A fuse in accordance with claim 1 wherein said interior facing projection comprises a notch formed in an outer surface of said ferrule, an inner surface of said notch establishing electrical connection to said fuse state indicator.

3. A fuse in accordance with claim 1 wherein said recessed contact area is distanced longitudinally from an end of said ferrule to position said recessed contact area further away from the other of said first and second ferrules.

4. A fuse in accordance with claim 1 wherein said at least one ferrule comprises a first portion having a first diameter, and a second portion extending from said first potion and having a second diameter, said first diameter greater than said second diameter, said recessed contact area formed in said first portion, and said first and second portions receiving an end of said body.

5. A fuse in accordance with claim 1 wherein said at least one ferrule comprises an inner surface, said interior facing projection extending from said inner surface toward said fine state indicator, and said inner surface spaced from an outer surface of said fuse body.

6. A fuse in accordance with claim 1 wherein said fuse state indicator comprises an indicator strip having a thin film metallic layer.

7. A fuse in accordance with claim 1 wherein said ferrule is substantially cylindrical, said interior facing projection extending radially inwardly from said ferrule.

8. A fuse in accordance with claim 1 further comprising a sealing compound securing said at least one ferrule to said fuse body.

9. A fuse comprising:
an insulative body comprising an outer surface and an inner surface;
first and second ferrules coupled to opposing ends of said insulative body with a primary fuse element extending therebetween within said insulative body, each of said first and second ferrules comprising a notch formed therein and extending toward said outer surface without creating an aperture therein;
a clearance between said outer surface and an interior surface of each of said first and second ferrules; and
a fuse state indicator extending on said outer surface between said first and second ferrules and in parallel with said primary fuse element, said notches electrically connecting said first and second ferrules to said fuse state indicator within said clearance.

10. A fuse in accordance with claim 9 wherein each notch extends radially inward from an outer surface a respective one of said first and second ferrules.

11. A fuse in accordance with claim 9 wherein said notches are distanced longitudinally from an end of the respective ferrules, thereby increasing a longitudinal separation of said notches and increasing the effective length of said fuse state indicator.

12. A fuse in accordance with claim 9 wherein at least one of said first and second ferrules comprises a first portion having a first diameter and a second portion having a second diameter, said first diameter greater than said second diameter, said notch formed in said first portion.

13. A fuse in accordance with claim 9 wherein each of said first and second ferrules comprises an inner surface, said notch projecting from said inner surface, said inner surface spaced from an outer surface of said fuse body.

14. A fuse in accordance with claim 9 wherein said fuse state indicator comprises an indicator strip having a thin film metallic layer.

15. A fuse in accordance with claim 9 wherein said first and second ferrules are substantially cylindrical.

16. A fuse in accordance with claim 9 further comprising a sealing compound securing said at least one ferrule to said fuse body.

17. A fuse comprising:
an insulative body;
a primary fuse element;
first and second conductive elements coupled to said insulative body with said primary fuse element extending therebetween, each of said first and second conductive elements comprising an inwardly facing notch formed therein for electrically connecting the first and second conductive elements to a fuse state indicator, said notch being formed without creating an aperture through the outer surface of the respective first and second conductive element, the fuse state indicator extending between said first and second conductive elements on an exterior surface of said insulative body and in parallel with said primary fuse element; and
a clearance between the exterior surface of the insulative body and an interior surface of each of the first and second conductive elements.

18. A fuse in accordance with claim 17 wherein said first and second conductive elements define a clearance around said body for venting of metallic vapors.

19. A fuse in accordance with claim 17 wherein said fuse state indicator comprises a strip having a thin metallic film.

20. A fuse in accordance with claim 17 wherein said conductive elements comprise cylindrical ferrules.

21. A system for determining failure in a fuse comprising:
a fuse body;
means for insulating said body;
means for protecting an electrical circuit;
means for indicating failure in a fuse; said indication means located on an exterior surface of said body and electrically connected in parallel with said circuit protection means;
first and second ferrules coupled to opposing ends of said fuse body and electrically connecting said circuit protection means and said indication means, at least one of said ferrules comprising means for establishing an electrical connection to said indication means and means for containment of vapors as a portion of said indication means vaporizes, said indication means extending between said ferrules.

* * * * *

UNITED STATES PATENT AND TRADEMARK OFFICE
CERTIFICATE OF CORRECTION

| | | |
|---|---|---|
| PATENT NO. | : 7,312,689 B2 | Page 1 of 1 |
| APPLICATION NO. | : 10/886084 | |
| DATED | : December 25, 2007 | |
| INVENTOR(S) | : John Marvin Ackermann | |

It is certified that error appears in the above-identified patent and that said Letters Patent is hereby corrected as shown below:

Col. 6 line 56
CLAIM 5: The word "fine" should be --fuse--, so the claim should read as:

5. A fuse in accordance with claim 1 wherein said at least one ferrule comprises an inner surface, said interior facing projection extending from said inner surface toward said fuse state indicator, and said inner surface spaced from an outer surface of said fuse body.

Signed and Sealed this

Thirteenth Day of May, 2008

JON W. DUDAS
*Director of the United States Patent and Trademark Office*